US012753787B2

(12) United States Patent
Phillips et al.

(10) Patent No.: US 12,753,787 B2
(45) Date of Patent: Oct. 6, 2026

(54) CONNECTOR ASSEMBLY

(71) Applicant: Ovvotech Innovations Limited, Newry (GB)

(72) Inventors: Sean Phillips, Newry (GB); Donal Phillips, Newry (GB)

(73) Assignee: Ovvotech Innovations Limited, Newry (GB)

( * ) Notice: Subject to any disclaimer, the term of this patent is extended or adjusted under 35 U.S.C. 154(b) by 177 days.

(21) Appl. No.: 18/695,286

(22) PCT Filed: Aug. 24, 2022

(86) PCT No.: PCT/EP2022/073604

§ 371 (c)(1),
(2) Date: Mar. 25, 2024

(87) PCT Pub. No.: WO2023/046401

PCT Pub. Date: Mar. 30, 2023

(65) Prior Publication Data

US 2024/0401624 A1 Dec. 5, 2024

(30) Foreign Application Priority Data

Sep. 24, 2021 (GB) .................................... 2113697

(51) Int. Cl.
*F16B 12/24* (2006.01)
*F16B 12/12* (2006.01)

(52) U.S. Cl.
CPC ............ *F16B 12/125* (2013.01); *F16B 12/24* (2013.01)

(58) Field of Classification Search
CPC .......... F16B 13/02; F16B 12/10; F16B 12/24; F16B 12/125; F16B 5/00; F16B 5/07
See application file for complete search history.

(56) References Cited

U.S. PATENT DOCUMENTS 5,125,442 A 6/1992 Hendrickson
5,468,109 A * 11/1995 Ferrari .................. F16B 12/20 411/549

(Continued)

FOREIGN PATENT DOCUMENTS

AT 250646 11/1966
CN 207830302 9/2018

(Continued)

OTHER PUBLICATIONS

International Search Report and Written Opinion of the International Searching Authority from corresponding Patent Cooperation Treaty (PCT) Application No. PCT/EP2022/073604, mailed Dec. 14, 2022.

(Continued)

*Primary Examiner* — Daniel J Wiley
(74) *Attorney, Agent, or Firm* — Gardner, Linn, Burkhart & Ondersma LLP

(57) ABSTRACT

A connector assembly for connecting a first article to a second article includes a male connector having a first connecting portion that is insertable into a receiving channel defined by a female connector. The female connector is adapted to be located in a first receiving recess formed, in use, in a face of the first article, the first receiving recess optionally having two or more intersecting and parallel blind bores in the face of the first article. Outer ends of the female connector have end portions adapted to engage opposing end faces of the receiving recess. The end portions of the female connector are acted upon by the male connector to be displaced outwardly to engage the opposing ends faces of the first receiving recess when the male connector is inserted into the receiving channel of the female connector.

17 Claims, 7 Drawing Sheets

(56) References Cited

U.S. PATENT DOCUMENTS

| | | | | |
|---|---|---|---|---|
| 6,045,309 | A * | 4/2000 | LeVey | F16B 19/1081 411/45 |
| 6,322,305 | B1 * | 11/2001 | Bantle | F16B 13/126 411/48 |
| 6,364,586 | B1 * | 4/2002 | Okada | F16B 21/08 411/48 |
| 6,651,400 | B1 | 11/2003 | Murphy | |
| 6,665,914 | B2 * | 12/2003 | Ogawa | F16B 5/06 24/297 |
| 6,685,407 | B1 * | 2/2004 | Holzman | F16B 19/1081 411/908 |
| 7,862,272 | B2 * | 1/2011 | Nakajima | F16B 21/084 411/48 |
| 8,104,989 | B2 | 1/2012 | Liu | |
| 8,641,315 | B2 | 2/2014 | Liu et al. | |
| 9,714,673 | B2 * | 7/2017 | Phillips | F16B 12/26 |
| 9,771,964 | B2 * | 9/2017 | Leveen | F16B 12/10 |
| 9,810,253 | B2 | 11/2017 | Koelling et al. | |
| 10,197,081 | B2 | 2/2019 | Koelling et al. | |
| 10,215,214 | B2 * | 2/2019 | Ligi, Jr. | F16B 19/00 |
| D883,077 | S | 5/2020 | Koelling et al. | |
| 11,255,364 | B2 * | 2/2022 | Phillips | F16B 12/26 |
| 11,598,360 | B2 * | 3/2023 | Wang | F16B 5/0642 |
| 11,920,623 | B2 * | 3/2024 | Lee | F16B 21/073 |
| 12,123,440 | B2 * | 10/2024 | Merz | F16B 12/24 |
| 12,173,738 | B2 * | 12/2024 | Ender-Lercher | F16B 13/02 |
| 2003/0143053 | A1 * | 7/2003 | Kanie | F16B 5/0642 411/45 |
| 2004/0020016 | A1 * | 2/2004 | Yoneoka | F16B 5/0642 24/297 |
| 2007/0160418 | A1 * | 7/2007 | Lo | F16B 13/02 403/275 |
| 2018/0031020 | A1 * | 2/2018 | Chen | F16B 12/24 |
| 2018/0209461 | A1 * | 7/2018 | Walz | F16B 12/20 |
| 2019/0055973 | A1 * | 2/2019 | Nitschmann | F16B 12/24 |
| 2019/0211859 | A1 * | 7/2019 | Liu | F16B 12/26 |
| 2020/0063776 | A1 † | 2/2020 | Bastian | |
| 2021/0381538 | A1 * | 12/2021 | Merz | F16B 13/065 |
| 2023/0081500 | A1 * | 3/2023 | Phillips | F16B 5/0024 403/292 |

FOREIGN PATENT DOCUMENTS

| | | |
|---|---|---|
| DE | 29608207 | 8/1996 |
| DE | 10229300 | 3/2004 |
| DE | 10229300 B3 † | 3/2004 |
| EP | 0995915 | 4/2000 |
| FR | 1546888 | 11/1967 |
| FR | 2233883 | 1/1975 |
| GB | 2061371 | 7/1983 |
| GB | 2592442 | 9/2021 |
| WO | 2013080160 | 6/2013 |

OTHER PUBLICATIONS

Office Action dated Mar. 20, 2025 in commonly-owned U.S. Appl. No. 17/801,957.

Office Action dated Jul. 1, 2025 in commonly-owned U.S. Appl. No. 17/801,957.

Third Party Submission filed Oct. 22, 2025 in U.S. Appl. No. 18/695,286.

European Examination Report for EPC Patent Application No. 22769182.1 dated Dec. 10, 2025.

Applicant's Amendment After Allowance in co-pending U.S. Appl. No. 17/801,957, filed Nov. 18, 2025.

USPTO Response to Rule 312 Communication following Notice of Allowance and Rule 12 Amendment in co-pending U.S. Appl. No. 17/801,957, dated Dec. 4, 2025.

* cited by examiner
† cited by third party

B
B
C
C

CONNECTOR ASSEMBLY

CROSS REFERENCE TO RELATED APPLICATIONS

The present application is a § 371 National stage of International Application PCT/EP2022/073604, filed Aug. 24, 2022, which claims priority benefit of U.K. Pat. Application Ser. No. 2113697.3, filed Sep. 24, 2021, both of which are hereby incorporated herein by reference in their entireties.

FIELD

This invention relates to a connector assembly for connecting articles to one another, and in particular to a connector assembly connecting together component parts of a ready to assemble article of furniture. However, it is envisaged that a connector assembly in accordance with the present invention may be used for connecting numerous other objects and articles to one another.

BACKGROUND

Ready to assemble furniture has been known in the furniture industry for many years. This type of furniture construction provides a number of advantages to the manufacturer, to the retailer, and to the customer. For example, as to the manufacturer, there are significant cost savings in manufacturing unassembled furniture over conventional fully assembled furniture. Ready to assemble furniture can be supplied flat packed, thus requiring less storage space for both the manufacturer and the retailer. The customer ultimately benefits the lower cost of ready to assemble furniture as opposed to pre-assembled furniture and the ease of transport of flat packed ready to assemble furniture.

Unlike conventional fully or pre-assembled furniture, ready to assemble furniture, as the name implies, requires assembly by the customer. This furniture often requires the use of tools by the customer to enable the manipulation of specialized fittings to assemble and secure the various components of the furniture together. The customers may not have the necessary tools or skill level to assemble the furniture properly. The failure to do so may result in the furniture being unstable, and potentially collapsing during use. It is therefore desirable to provide ready to assemble furniture which can be assembled without the need for tools in a simple and efficient manner, while ensuring the integrity of the resulting assembled furniture.

As shown in WO 2018/019752, it is known to provide improved connector assemblies for connecting articles to one another, wherein the connector assembly comprising a male connector insertable into a substantially U shaped receiving channel defined by a respective female connector, said female connector being adapted to be located in a slot formed, in use, in one of at least two articles to be connected together. This type of connector assembly has the advantage of being able to be assembled without the use of tools. The slot is normally formed in a face of one of the articles by a milling process. The female connector is adapted to be retained within the milled slot by exerting a retaining force against the sides of the milled slot by means or barbs or shoulders formed on the outer sides of the female connector. Likewise, the male connector is retained in the receiving channel of the female connector by wings or other formations engaging in the inner sides of the female connector. As such, the connector assembly exerts considerable lateral forces against the sides of the milled slot. This can be a particular problem wherein the receiving slot is formed in or adjacent an edge of a panel, since the thickness of material on one or both sides of the receiving slot may be insufficient to withstand such lateral forces without the risk of splitting. Furthermore, the tooling required to form the milled slots can be costly and the formation of such receiving slots can be a relatively slow process.

SUMMARY OF THE INVENTION

Connector assemblies disclosed herein can minimize lateral forces imparted to the articles used to construct ready to assemble furniture, and can reduce or avoid the need for milled slots in the articles. According to a first aspect of the present invention there is provided a connector assembly for connecting a first article to a second article, the connector assembly comprising a male connector having a first connecting portion insertable into a receiving channel defined by a female connector, the female connector being adapted to be located in a first receiving recess formed, in use, in a face of the first article, outer regions of the female connector including end portions adapted to engage opposing inner faces of the receiving recess, the end portions of the female connector being acted upon by the male connector to be displaced outwardly to engage the opposing inner faces of the first receiving recess when the male connector is inserted into the receiving channel of the female connector.

In one embodiment the first receiving recess comprises two or more intersecting and parallel blind bores. The blind bores of the first receiving recess may have equal radii, the spacing of the centres of the blind bores being less than the radius of each bore. Alternatively the two or more blind bores may have differing radius.

In an alternative embodiment the first receiving recess may comprise a single blind bore.

In one embodiment the end portions of the of the female connector may comprise integrally formed cantilevered arms extending towards an inner end of the female connector and each having an outer face and an inner face, the inner face of each cantilevered arm defining a ramped surface engaged by the first connecting portion of the male connector as it is inserted into the receiving channel of the female connector, thereby deflecting the cantilevered arms outwardly against the inner faces of the first receiving recess. Optionally the outer face of each cantilevered arm is barbed to grip the inner faces of the first receiving recess.

The outer surfaces of the female connector may be shaped to correspond to the internal surfaces of the first receiving recess.

The first connecting portion of the male connector may include ramped side regions adapted to engage the inner faces of the cantilevered arms of the female connector as the male connector is inserted therein.

Optionally, the inner faces of the receiving channel of the female connector and cooperating outer faces of the first connecting portion of the male connector are provided with cooperating formation to retain the male connector within the female connector when the first connecting portion of the male connector is inserted into the receiving channel of the female connector.

In one embodiment the inner sides of the receiving channel defined by the female connector may comprise a pair of opposing shoulders and narrowed neck region, the first connecting portion of the male connector comprising at least one rib extending outwardly from an enlarged base region of the male connector and terminating in a head region, a pair of symmetrically arranged outwardly flared resilient wings having a substantially arrow head shaped cross section extending from the head region towards the base region on either side of the at least one rib, whereby the resilient wings of the first connecting portion of the male connector are adapted to engage the opposing shoulders of the female connector when the male connector is inserted into the female connector to retain the male connector in engagement with the female connector.

In one embodiment the male connector may be provided with at least one second connecting portion adapted to be received within at least one second receiving recess formed, in use, in a face of the second article, wherein the at least one second receiving recess comprising at least one blind bore formed by a drilling in the face of the second article. Optionally, the first and at least one second connecting portions extend in opposite directions from a central region of the male connector.

According to a second aspect of the present invention there is provided an assembly comprising a connector assembly in accordance with the first aspect of the invention and first and second articles connected by the connector assembly, wherein the connector assembly comprises a male connector having a first connecting portion insertable into a receiving channel defined by a female connector, the female connector being adapted to be located in a first receiving recess formed in a face of the first article, the first receiving recess comprising at least one blind bore in the face of the first article.

The first receiving recess may comprise two or more intersecting and parallel blind bores. The blind bores of the first receiving recess may have equal radii, the spacing of the centres of the blind bores being less than the radius of each bore.

According to a further aspect of the present invention there is provided an article of furniture incorporating an assembly in accordance with the second aspect of the invention.

According to a further aspect of the present invention there is provided a method of assembling first and second articles using a connector assembly comprising a male connector having a first connecting portion insertable into a receiving channel defined by a female connector, comprising the steps of drilling at least one blind bore in the face of the first article to form a first receiving recess, locating the female connector into the first receiving recess whereby outer regions of the female connector engage opposing inner faces of the receiving recess, and inserting the first connecting portion of the male connector into the receiving channel of the female connector whereby the connecting portion of the male connector acts against moveable end portions of the female connector such that the end portions are displaced outwardly to engage opposing inner faces of the first receiving recess to retain the female connector within the first receiving recess.

In one embodiment the formation of the first receiving recess comprises drilling two or more intersecting and parallel blind bores in the face of the first article.

Optionally, the blind bores of the first receiving recess have equal radius, the spacing of the centres of the blind bores being less than the radius of each bore.

Alternatively the at least one receiving recess may comprise a single blind bore or drilling.

The method may comprise the further step of drilling at least one blind bore in a face of the second article to define at least one second receiving recess and inserting at least one second connecting portion of the male connector into the at least one second receiving recess to secure the male connector to the second article. The at least one second connecting portion of the male connector may be provided with barbs or other formations to retain the at least one second connecting portion of the male connector within the at least one second receiving recess.

The end portions of the of the female connector may comprise integrally formed cantilevered arms extending towards an inner end of the female connector and each having an outer face and an inner face, the inner face of each cantilevered arm defining a ramped surface engaged by the first connecting portion of the male connector as it is inserted into the receiving channel of the female connector, thereby deflecting the cantilevered arms outwardly against the end faces of the first receiving recess. An outer surface of each cantilevered arm may be barbed to grip the end faces of the first receiving recess.

These and other objects, advantages, purposes and features of the present invention will become apparent upon review of the following specification in conjunction with the drawings

BRIEF DESCRIPTION OF THE DRAWINGS

Connector assemblies in accordance with different embodiments of the present invention will now be described by way of example only, with reference to the accompanying drawings, in which:—

DETAILED DESCRIPTION OF THE DRAWINGS

Figures 1, 2, 3, 4, 5, 6, 7, 8:
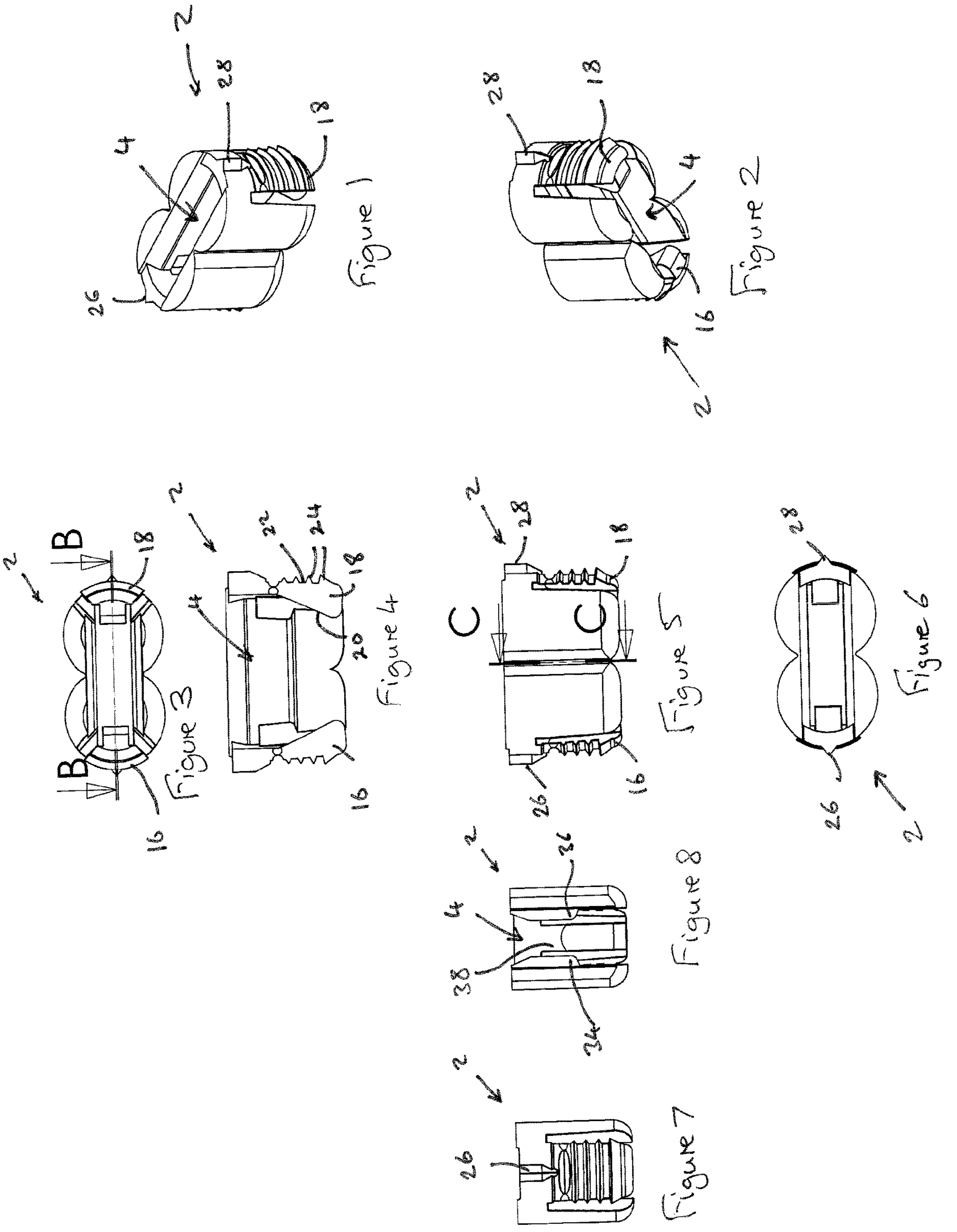
FIGS. 1 and 2 are perspective views of a female connector of a connector assembly according to a first embodiment of the present invention.
FIG. 3 is a bottom view of the female connector of FIGS. 1 and 2.
FIG. 4 is sectional view along line B-B of FIG. 3.
FIG. 5 is a side view of the female connector of FIG. 1.
FIG. 6 is a top view of the female connector of FIG. 1.
FIG. 7 is an end view of the female connector of FIG. 1.
FIG. 8 is a sectional view along line C-C of FIG. 5
Figure 9:
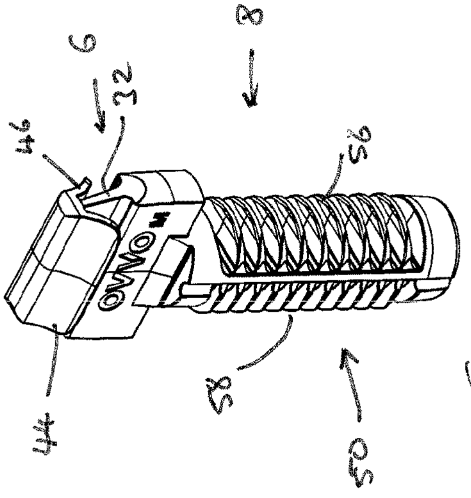
FIGS. 9 and 10 are perspective views of a male connector of the connector assembly according to a second embodiment of the present invention.
Figure 10:
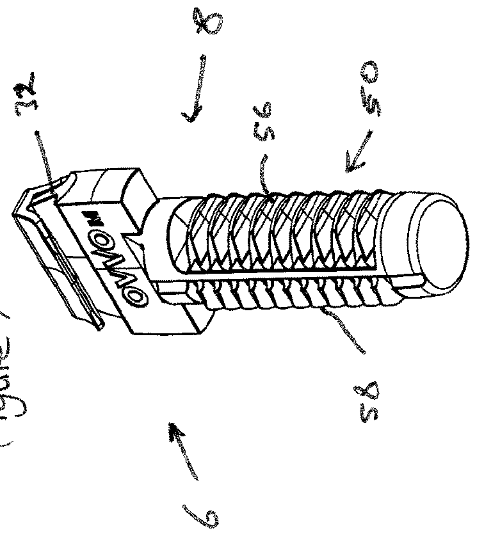

A connector assembly for coupling objects together, for example for first and second components of a ready to assemble article of furniture together, in accordance with several embodiments illustrated in FIGS. 1 to 20.

The connector assembly includes a female connector 2 comprising an elongate U-section member defining a receiving channel 4 for receiving a first connecting portion 6 of a cooperating male connector 8, the female connector 2 being adapted to be inserted into a cooperating first receiving recess 10 in a face of a first 9 of two components to be coupled together.

Figure 14:
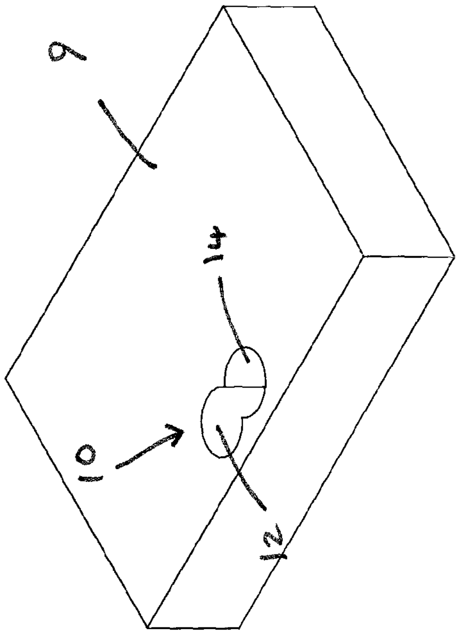
FIG. 14 is a perspective view of a receiving recess formed in a first article for receiving the female connector of FIGS. 1 to 8.
Figure 15:
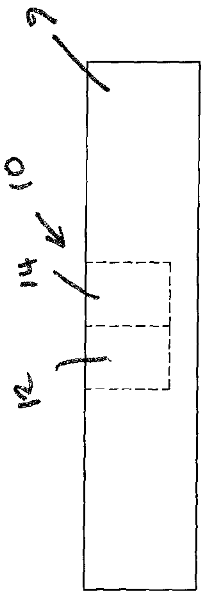
FIG. 15 is a side view of the receiving recess of FIG. 14.
Figure 16:
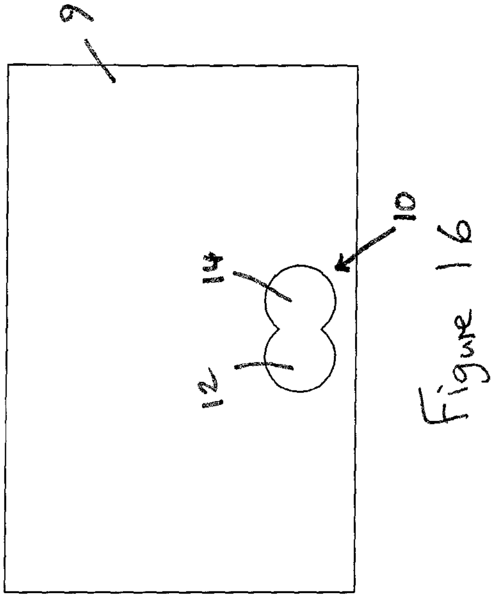
FIG. 16 is a plan view of the receiving recess for FIG. 14.
Figure 17:
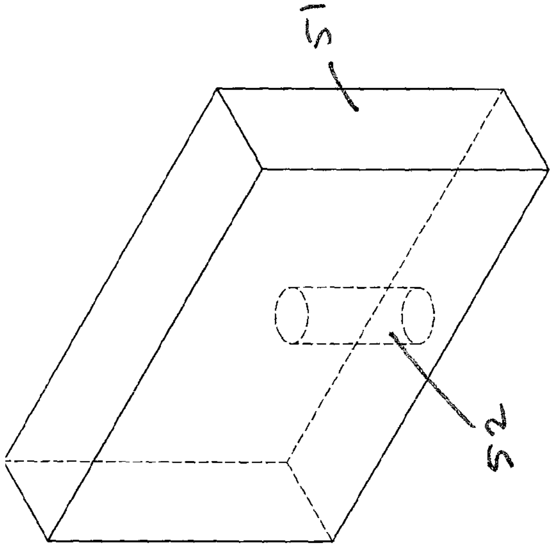
FIG. 17 is a perspective view of a receiving recess formed in a second article for receiving the male connector of FIGS. 9 to 14.
Figure 18:
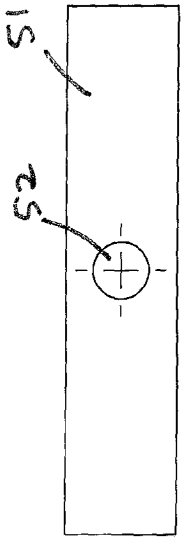
FIG. 18 is a plan view of the receiving recess of FIG. 17.
Figure 19:
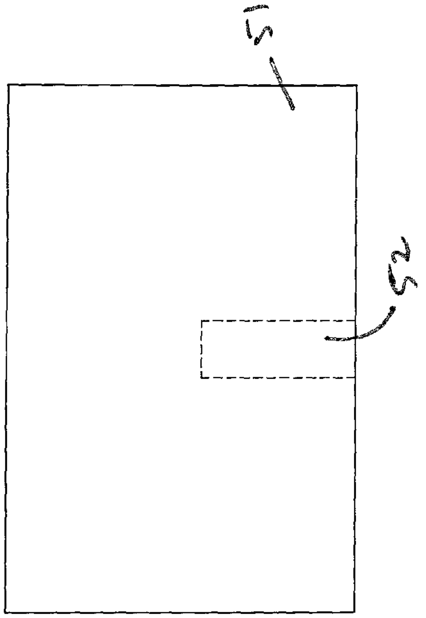
FIG. 19 is a side view of the receiving recess of FIG. 17.
Figure 20:
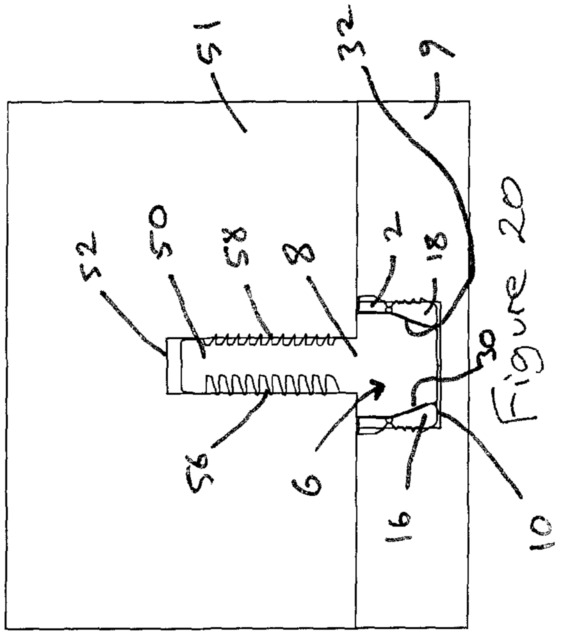
FIG. 20 is a sectional view showing the assembled connector assembly of the second embodiment of the present invention.

As illustrated in FIGS. 14 to 16, the first receiving recess 10 is formed by a pair of parallel and overlapping drillings 12,14 in a face of the first component 9, the radii of the two drillings being greater than the spacing of the centres of the drillings such that the thus formed blind bores combine to define a substantially figure of eight shaped recess.

The side faces of the female connector 2 are shaped to correspond to the inner shape of the first receiving recess 10 into which it is inserted.

With reference to FIGS. 1 to 8, end portions of the female connector 2 include integrally formed cantilevered arms 16,18 extending towards an inner end of the female connector 10 and connected to the remainder of the end portions of the female connector adjacent its outer face by means of live hinges.

Each cantilevered arm 16,18 has an inner face 20 and an outer face 22, the thickness of each cantilevered arm between the inner and outer faces increasing towards a distal end thereof such that the inner face 20 of each cantilevered arm 16, 18 defines an inwardly ramped surface engaged by the first connecting portion 6 of the male connector 8 as it is inserted into the receiving channel 4 of the female connector 2, thereby deflecting the cantilevered arms 16,18 outwardly against cooperating inner faces of the first receiving recess 10 to retain the female connector 2 within the first receiving recess 10. As such, the retaining face holding the female connector 2 within the first receiving recess 10 extends parallel to the longitudinal axis of the first receiving recess 10, mitigating the risk of the material of the first component 9 around the first receiving recess 10 splitting.

The outer face 22 of each cantilevered arm incorporates integrally formed barbs 24 to grip into the inner faces of the first receiving recess 10. As best shown in FIG. 4, the height of the barbs 24 optionally increases towards the distal end of each cantilevered arm 16,18 and some or all of the barbs 24 may be tapered away from the distal end of each cantilevered arm 16,18.

Spurs 26,28 are provided on each end of the female connector 2 adjacent an outer face of the female connector and extending outwardly from either end of the female connector, such spurs 26,28 providing additional grip between the female connector 2 and the first receiving recess 10 while limiting the depth of insertion of the female connector 2 into the first receiving recess 10. After inserting the female connector 2 into the first receiving recess 10, flush with surface of the panel in which the first receiving recess is formed, the spurs 26,28 prevent the female connector 2 from going further into the material. The spurs 26,28 also prevent rotation of the female connector 2 where inserted into a single circular receiving recess or hole. The spurs 26,28 are shaped to engage with the sides of the first receiving recess 10 in a wedge like manner. The female connector 2 is urged into the first receiving recess 10, optionally by means of a mallet/hammer (tooling) or a hydraulic arm (mechanical device), until the female connector 2 is left flush with the top surface of the panel at the correct depth setting of the female connector 2 no matter how deep the borehole, the spurs 26,28 preventing the female connector 2 from being pushed too far into the first receiving recess 10.

Figure 11:
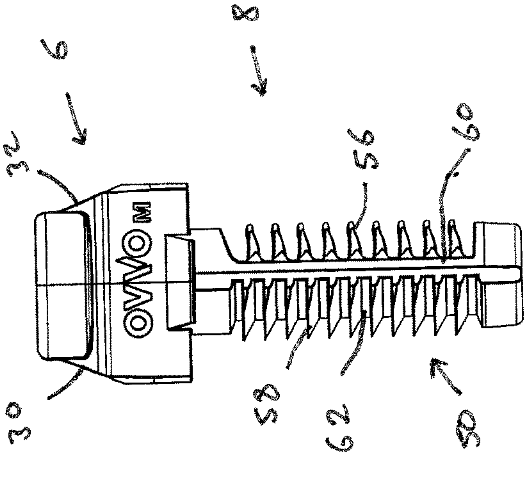
FIG. 11 is a side view of the male connector of FIGS. 9 and 10.
Figure 13:
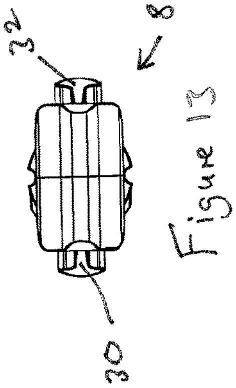
FIG. 13 is an end view of the male connector of FIG. 9.
Figure 12:
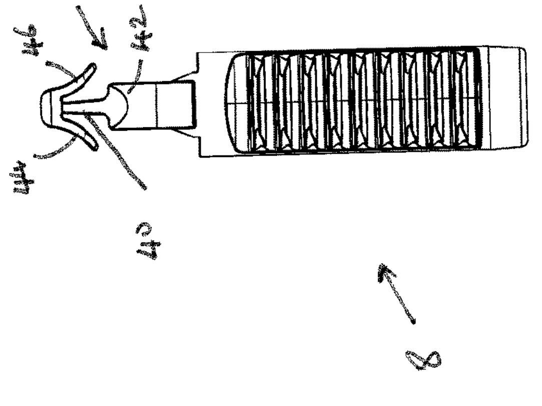
FIG. 12 is an end view of the male connector of FIG. 11.

As shown in FIGS. 9 to 13, with particular reference to FIG. 11, the first connecting portion 6 of the male connector 8 includes ramped side regions 30,32 adjacent a distal end thereof, the ramped side regions 30,32 being adapted to engage the inner faces 20 of the cantilevered arms 16,18 of the female connector 2 as the male connector 8 is inserted therein in order to deflect the cantilevered arms 16,18 of the female connector 2 outwardly against the end faces of the first receiving recess 10 to retain the female connector 2 therein once the male connector 8 is inserted into the female connector 2.

The receiving channel 4 of the female connector 2 comprises side walls shaped to define a pair of opposing shoulders 34,36 on the inner faces of the receiving channel 4, facing towards one another, the side walls defining a narrow neck region 38 at the outer side of the receiving channel.

The first connecting portion 6 of the male connector 8 comprises a central rib 40 extending outwardly from a base region 42, a distal end of the central rib 40 supporting a respective pair of outwardly flared symmetrically arranged resilient wings 44,46 on either side thereof, the wings 44,46 extending towards the base region 42, the resilient wings 44,46 having a substantially arrow head shaped cross section extending on either side of the central rib 40. Each wing 44,46 is curved in an outwards direction away from the central rib 40 towards the free ends of the wings 44,46.

When the first connecting portion 6 of the male connector 8 is inserted into the receiving channel 4 of the female connector 2 the wings 44,46 pass through the neck region 38 of the receiving channel 4 and then spring out to engage the undersides of the shoulders 34,36 of the receiving channel 4, thereby preventing subsequent removal of the male connector 8 from the female connector 2.

The resilient wings 44,46 of the first connecting portion 6 of the male connector 8 are resiliently displaceable towards to the respective central rib 40 to enable the wings 44,46 to pass through the narrowed neck region 38 of the receiving channel 4 of the female connector 2, the distal ends of the resilient wings 44,46 engaging the shoulders 34,36 of the receiving channel of the female connector 2 once the male connector 8 has been inserted therein to retain the male connector 8 therein.

The outward curvature of each resilient wing 44,46 ensures that the connector assembly resists any forces attempting to pull the connector assembly apart, such forces causing the wings 44,46 to bend outwardly, ensuring that the distal ends of the wings 44,46 remain firmly located behind the respective shoulders 34,36 of the receiving channel 4 of the female connector 2. The curvature provides a resilience to the wings 44,46 such that the male connector 20 is effectively spring loaded within the respective female connector 2. The base region 22 of the male connector 20 is dimensioned to be received within the neck region 38 of the receiving channel of the female connector 2 when the male connector 20 is inserted therein.

As shown in FIGS. 9 to 13, a second connecting portion 50 of the male connector 8 is adapted to be received within a second receiving recess 52 formed, in use, in a face of the second article 51. Optionally, the first and second connecting portions 6,50 of the male connector 8 extend in opposite directions from a central region 54 of the male connector 8.

In the embodiment shown, the second receiving recess 52 comprises a single blind bore formed by drilling a hole in a face of the second article 51.

The second connecting portion 50 of the male connector 8 may be in the form of a dowel of the type discloses in WO 2021/170526, which corresponds to commonly-owned U.S. Pub. No. 2023/0081500, now U.S. Pat. No. 12,546,353, and is hereby incorporated herein by reference. Sets of barbs 56,58 are disposed along the second connecting portion 50 of the male connector 8, angled to hinder or prevent the removal of the second connecting portion 50 from the second receiving recess 52 when inserted therein.

The second connecting portion 50 of the male connector 8 has a flat face 60 on a first side thereof, a first set 56 of the barbs extending in cantilever manner from the flat face 60, the second connecting portion 50 of the male connector 8 having a curved face 62 on a second side thereof, opposite the first side, a second set 58 of the barbs, having an arcuate shape, extending from the curved face 62.

The outermost ends of the barbs 56,58 are shaped to define a substantially cylindrical outer surface of the second connecting portion 50 of the male connector 8 of slightly larger diameter than that of the second receiving recess 52.

Each first set of barbs 56 extend in cantilever manner from the flat face 60 of the second connecting portion 50 of the male connector 8 to provide enhanced resistance to removal by virtue of the first sets of barbs 56 being longer than the arcuate second sets of barbs 58 extending from the curved face 62 of the second connecting portion 50 of the male connector 8, the first sets of barbs 56 providing a relatively strong lever action against the sides of the second receiving recess 52 compared to known arcuate barbs, such that the first sets of barbs 56 act to urge the second set of barbs 58 against the side of the second receiving recess 52, thereby providing enhanced resistance to removal of the male connector 8 from the second receiving recess 52.

Alternatively it is envisaged that the second connecting portion of the male connector 8 may be identical and a mirror image of the first connecting portion, the second receiving recess being identical to the first receiving recess, the second connecting portion of the male connector being insertable into a further female connector of the type described above, the further female connector being inserted into the second receiving recess.

Figure 21:
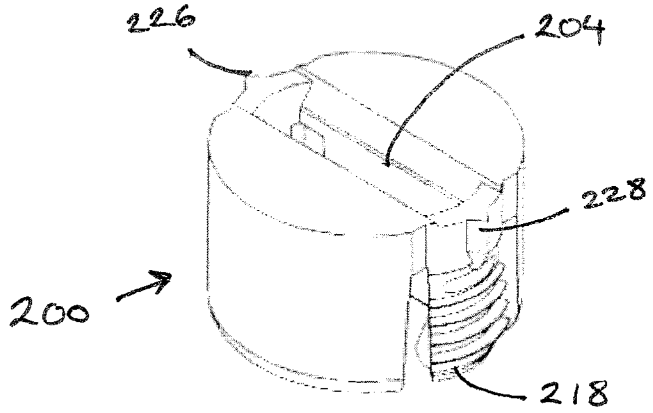
FIG. 21 is a perspective view of a female connector of a connector assembly in accordance with a third embodiment of the present invention.
Figure 22:
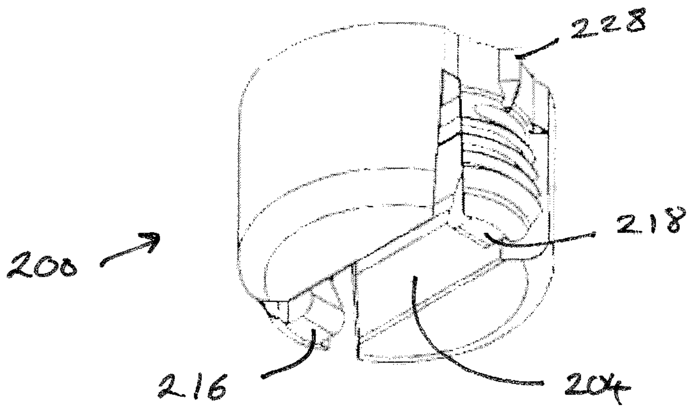
FIG. 22 is a further perspective view of the female connector of FIG. 21.
Figure 23:
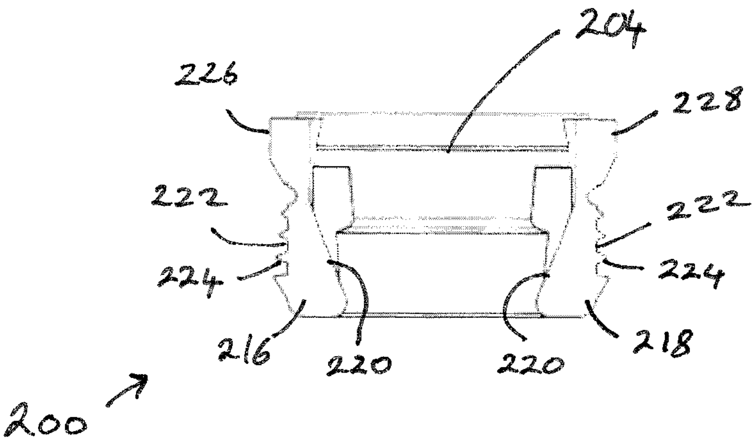
FIG. 23 is a sectional view through the female connector of FIG. 21.

In an alternative third embodiment the first receiving recess 10 may comprise a single drilling or blind bore. In such embodiment, as illustrated in FIGS. 21 to 23, the female connector 200 may have a circular profile in plan view, adapted to be inserted in a single hole first receiving recess. The remaining structure of the female connector 200 remains the same as that of the previous embodiment, the female connector 200 defining a receiving channel 204 for receiving a first connecting portion of a cooperating male connector of the same type as that shown in relation to the first embodiment, the female connector 200 being adapted to be inserted into a cooperating blind bore defining a first receiving recess in a face of a first of two components to be coupled together.

The female connector 200 include integrally formed cantilevered arms 216,218 on opposite side regions of the female connector and extending towards an inner end of the female connector 200 and connected to the remainder of the end portions of the female connector adjacent its outer face by means of live hinges, each cantilevered arm 216,218 having an inner face 220 and an outer face 222, the thickness of each cantilevered arm between the inner and outer faces increasing towards a distal end thereof such that the inner face 220 of each cantilevered arm 216,218 defines an inwardly ramped surface engaged by the first connecting portion of the male connector as it is inserted into the receiving channel of the female connector 200, thereby deflecting the cantilevered arms 216,218 outwardly against cooperating inner faces of the first receiving recess to retain the female connector 200 within the first receiving recess.

The outer face 222 of each cantilevered arm incorporates integrally formed barbs 224 to grip into the inner faces of the first receiving recess. Spurs 226,228 are provided on opposite sides of the female connector 200 adjacent an outer face of the female connector 200 and adjacent each cantilevered arm 216,218, such spurs limiting the depth of insertion of the female connector 200 into the first receiving recess and preventing rotation of the female connector 200 within the first receiving recess.

Figure 24:
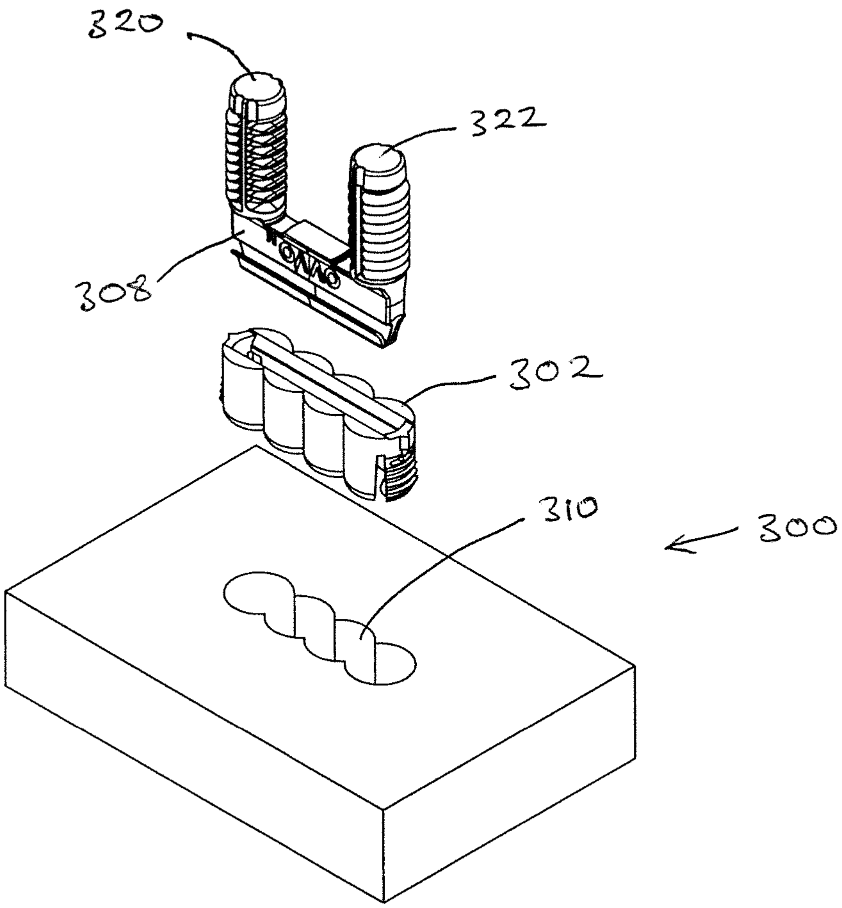
FIG. 24 is a perspective view of a connector assembly in accordance with a fourth embodiment of the present invention.

FIG. 24 illustrates a connector assembly 300 in accordance with a fourth embodiment, wherein the first receiving recess 310 is formed from four parallel and overlapping holes do define a longer recess. In such embodiment the length of both the female connector 302 and male connector 308 are corresponding increased. The increased length of the male connector 308 allows the male connector to be attached to a second article by means of a pair of parallel barbed second connecting portions 320,322 form at either end of the male connector 308 and each adapted to be received within a respective second receiving recess formed, in use, in a face of the second article.

While the connector assemblies have been described in relation to a ready to assemble/self assembly article of furniture, it is envisaged that such connector assembly may be utilised to interconnect a wide variety of articles, such as in automotive assemblies, or any other application where it is desired to couple to connect two articles in a rapid and reliable manner, optionally without requiring the use of tools. The connector assembly in accordance with the present invention may be used on all types of self assembly furniture wherein butting panels need to be attached to one another.

The invention is not limited to the embodiments described herein but can be amended or modified without departing from the scope of the present invention which is intended to be limited only by the scope of the appended claims as interpreted according to the principles of patent law including the doctrine of equivalents

The invention claimed is:

1. A connector assembly for connecting a first article to a second article, said connector assembly comprising:

a female connector defining a receiving channel;

a male connector having a first connecting portion insertable into said receiving channel of said female connector;

said female connector being adapted to be located in a first receiving recess formed in a face of the first article, the first receiving recess comprising a pair of intersecting and parallel blind bores having equal radii, the spacing of the centres of the blind bores being less than the radius of each blind bore;

said male connector having a second connecting portion receivable within a second receiving recess formed in a face of the second article, the second receiving recess comprising a blind bore formed in the face of the second article;

wherein outer regions of said female connector include end portions adapted to engage opposing inner faces of the first receiving recess;

said end portions of said female connector configured to be acted upon by said male connector to be displaced outwardly to engage the opposing inner faces of the first receiving recess when said male connector is inserted into said receiving channel of said female connector;

wherein said end portions of said female connector comprise integrally-formed cantilevered arms, each of said cantilevered arms having an outer face and an inner face;

said inner face of each said cantilevered arm defining a ramped surface engaged by said first connecting portion of said male connector as it is inserted into said receiving channel of said female connector, thereby operable to deflect said cantilevered arms outwardly against the opposing inner faces of the first receiving recess; and wherein opposing inner side faces of said receiving channel of said female connector and cooperating outer side faces of said first connecting portion of said male connector are provided with cooperating formations to retain said male connector within said female connector when said first connecting portion of said male connector is inserted into said receiving channel of said female connector.

2. The assembly of claim 1, wherein said end portions of said female connector comprise integrally formed cantilevered arms, each having an outer face and an inner face, said inner face of each said cantilevered arm defining a ramped surface engaged by said first connecting portion of said male connector as it is inserted into said receiving channel of said female connector, thereby deflecting said cantilevered arms outwardly against the opposing inner faces of the first receiving recess.

3. The assembly of claim 2, wherein said outer face of each said cantilevered arm is barbed to grip the opposing inner faces of the first receiving recess.

4. The assembly of claim 2, wherein side surfaces of said female connector are shaped to correspond to the shape of the first receiving recess.

5. The assembly of claim 2, wherein said first connecting portion of said male connector includes ramped end regions adapted to engage said inner faces of said cantilevered arms of said female connector as said male connector is inserted therein.

6. The assembly of claim 1, wherein inner sides of said receiving channel defined by said female connector comprise a pair of opposing shoulders and narrowed neck region, said first connecting portion of said male connector comprising a central rib extending outwardly from a base region and terminating in a head region, a pair of symmetrically arranged outwardly flared resilient wings having a substantially arrow head shaped cross section extending from said head region towards said base region on either side of said central rib, whereby said resilient wings of said first connecting portion of said male connector are adapted to engage said opposing shoulders of said female connector when said male connector is inserted into said female connector to retain said male connector in engagement with said female connector.

7. The assembly of claim 1, wherein said male connector has at least one second connecting portion adapted to be received within at least one second receiving recess formed in a face of the second article, wherein the at least one second receiving recess comprises at least one blind bore formed by a drilling in the face of the second article.

8. A furniture subassembly comprising:

a first article and a second article, said first article having a face and a first receiving recess formed in said face;

a connector assembly for connecting said first and second articles, said connector assembly comprising:

a female connector defining a receiving channel;

a male connector having a first connecting portion insertable into said receiving channel defined by said female connector;

said female connector being adapted to be located in said first receiving recess formed in said face of said first article, said first receiving recess comprising a pair of intersecting and parallel blind bores in said face of said first article, said blind bores having equal radii, the spacing of the centres of said blind bores being less than the radius of each said blind bore;

wherein outer regions of said female connector include end portions adapted to engage opposing inner faces of said first receiving recess;

said end portions of said female connector configured to be acted upon by said male connector to be displaced outwardly to engage said opposing inner faces of said first receiving recess when said male connector is inserted into said receiving channel of said female connector;

wherein said end portions of said female connector comprise integrally-formed cantilevered arms, each of said cantilevered arms having an outer face and an inner face;

said inner face of each said cantilevered arm defining a ramped surface engaged by said first connecting portion of said male connector as it is inserted into said receiving channel of said female connector, thereby operable to deflect said cantilevered arms outwardly against the opposing inner faces of the first receiving recess; and wherein opposing inner side faces of said receiving channel of said female connector and cooperating outer side faces of said first connecting portion of said male connector are provided with cooperating formations to retain said male connector within said female connector when said first connecting portion of said male connector is inserted into said receiving channel of said female connector.

9. The furniture subassembly of claim 8, wherein said first receiving recess comprises three or more of said intersecting and parallel blind bores.

10. The furniture subassembly of claim 9, wherein said three or more blind bores of said first receiving recess have equal radii, the spacing of the centres of said three or more blind bores being less than the radius of each bore.

11. An article of furniture incorporating the furniture subassembly of claim 8.

12. A method of assembling first and second articles using a connector assembly comprising a male connector having a first connecting portion insertable into a receiving channel defined by a respective female connector, said method comprising the steps of:

drilling at least two intersecting and parallel blind bores in the face of the first article to form a first receiving recess, the blind bores of the first receiving recess having equal radii, the spacing of the centres of the blind bores being less than the radius of each blind bore;

locating the female connector into the first receiving recess whereby outer portions of the female connector engage opposing inner end faces of the first receiving recess;

inserting the first connecting portion of the male connector into the receiving channel of the female connector, whereby the connecting portion of the male connector acts against moveable end portions of the female connector such that the end portions are displaced outwardly to engage the opposing inner end faces of the first receiving recess to retain the female connector within the first receiving recess;

wherein the end portions of the of the female connector comprise integrally-formed cantilevered arms each having an outer face and an inner face, the inner face of each cantilevered arm defining a ramped surface;

wherein said acting against the moveable end portions of the female connector by the connecting portion of the male connector comprises engaging the inner face of each cantilevered arm with the first connecting portion of the male connector as it is inserted into the receiving channel of the female connector, thereby deflecting the cantilevered arms outwardly against the opposing inner end faces of the first receiving recess; and drilling a blind bore in a face of the second article to define a second receiving recess and inserting a second connecting portion of the male connector into the second receiving recess to secure the male connector to the second article, wherein only the second connecting portion is received in the second receiving recess.

13. The method of claim 12, wherein said forming the first receiving recess comprises drilling two or more intersecting and parallel blind bores in the face of the first article.

14. The method of claim 13, wherein the blind bores of the first receiving recess have equal radius, the spacing of the centres of the blind bores being less than the radius of each bore.

15. The method of claim 12, further comprising:

drilling at least one blind bore in a face of the second article to define at least one second receiving recess; and inserting at least one second connecting portion of the male connector into the at least one second receiving recess to secure the male connector to the second article.

16. The method of claim 15, wherein the at least one second connecting portion of the male connector is provided with barbs or other formations adapted to retain the at least one second connecting portion of the male connector within the at least one second receiving recess.

17. The method of claim 12, wherein an outer surface of each cantilevered arm is barbed to grip the opposing inner end faces of the first receiving recess.

* * * * *